United States Patent
Oberheide

(10) Patent No.: US 10,505,968 B2
(45) Date of Patent: *Dec. 10, 2019

(54) METHODS AND SYSTEMS FOR IMPLEMENTING A PHISHING ASSESSMENT

(71) Applicant: Duo Security, Inc., Ann Arbor, MI (US)

(72) Inventor: Jon Oberheide, Ann Arbor, CA (US)

(73) Assignee: Duo Security, Inc., Ann Arbor, MI (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/936,609

(22) Filed: Mar. 27, 2018

(65) Prior Publication Data

US 2018/0219906 A1 Aug. 2, 2018

Related U.S. Application Data

(63) Continuation of application No. 15/587,117, filed on May 4, 2017, now Pat. No. 9,961,101, which is a continuation of application No. 15/337,054, filed on Oct. 28, 2016, now Pat. No. 9,674,213.

(60) Provisional application No. 62/248,031, filed on Oct. 29, 2015.

(51) Int. Cl.
*H04L 29/06* (2006.01)

(52) U.S. Cl.
CPC .......... *H04L 63/1433* (2013.01); *H04L 63/10* (2013.01); *H04L 63/105* (2013.01); *H04L 63/1483* (2013.01); *H04L 63/1491* (2013.01)

(58) Field of Classification Search
CPC ............. H04L 63/1416; H04L 63/1441; H04L 63/1433
See application file for complete search history.

(56) References Cited

U.S. PATENT DOCUMENTS

| | | |
|---|---|---|
| 7,756,987 B2 | 7/2010 | Wang et al. |
| 8,307,431 B2 | 11/2012 | Krishnamurthy et al. |
| 8,448,245 B2 | 5/2013 | Banerjee et al. |
| 8,510,411 B2 | 8/2013 | Coulson et al. |
| 8,516,581 B2 | 8/2013 | Hsu et al. |
| 8,578,166 B2 | 11/2013 | De Monseignat et al. |
| 8,578,481 B2 | 11/2013 | Rowley |

(Continued)

OTHER PUBLICATIONS dnstwist: Added experimental fuzzing algorithm: dictionary + Rearranged files/dirs; Oct. 14, 2015; retrieved on Aug. 30, 2017 https://www.morningstarsecurity.com/research/urlcrazy.

(Continued)

*Primary Examiner* — Jason K Gee
(74) *Attorney, Agent, or Firm* — Jeffrey Schox; Padowithz Schox

(57) ABSTRACT

A system, method, and computer program product for implementing a phishing assessment of a target computer network that includes a phishing assessment platform for generating parameters for the phishing assessment; generating the phishing assessment parameters includes identifying a target domain name for the phishing assessment; identifying a pseudo domain name based on the target domain name; generating a pseudo web page using one or more features and attributes of an entity; and implementing the phishing assessment using the pseudo domain name and pseudo web page.

20 Claims, 4 Drawing Sheets

(56) References Cited

U.S. PATENT DOCUMENTS

| | | |
|---|---|---|
| 8,608,487 B2 | 12/2013 | Huie et al. |
| 8,707,426 B1 | 4/2014 | Ramzan et al. |
| 8,832,774 B2 | 9/2014 | Nestler et al. |
| 8,839,369 B1 | 9/2014 | Dai et al. |
| 9,065,850 B1 | 6/2015 | Sobrier |
| 9,118,704 B2 | 8/2015 | Miller |
| 9,160,766 B2 | 10/2015 | Kashyap et al. |
| 9,218,482 B2 | 12/2015 | Ma et al. |
| 9,270,646 B2 | 2/2016 | Shelest |
| 9,276,956 B2 | 3/2016 | Geng et al. |
| 9,282,117 B2 | 3/2016 | Schmidtler |
| 9,501,746 B2 | 11/2016 | Prakash |
| 9,516,058 B2 | 12/2016 | Antonakakis et al. |
| 9,621,566 B2 | 4/2017 | Gupta et al. |
| 2007/0124803 A1* | 5/2007 | Taraz ............... G06F 21/577 726/4 |
| 2009/0006575 A1* | 1/2009 | Hulten ............... G06F 21/577 709/207 |
| 2010/0132016 A1 | 5/2010 | Ferris |
| 2013/0198846 A1* | 8/2013 | Chapman ........... G06Q 10/0635 726/25 |
| 2015/0052053 A1 | 2/2015 | Howe |
| 2015/0281244 A1 | 10/2015 | Wen |
| 2016/0055490 A1 | 2/2016 | Keren et al. |
| 2017/0013008 A1 | 1/2017 | Carey et al. |

OTHER PUBLICATIONS

Domain Typo Finder; by Domain Tools; Sep. 9. 2015; retrieved on Aug. 30, 2017 https://web.archive.org/web/20150909015047/http://research.domaintools.com/buy/domain-typo-finder/.

Ethical Hacking. "How to create fake or Phishing Web page for Gmail." Nov. 23, 2010. Https://breakthesecurity.cysecurity.org/2010/11/how-to-create-fake-or-phishing-web-page-for-gmail.html. Accessed on Jul. 5, 2017. 4 pages.

URL Crazy; Andrew Horton: Morningstar Security; Jul. 2012; retrieved on Aug. 30, 2017 https://www.morningstarsecurity.com/research/urlcrazy.

* cited by examiner

User: 568245    Access Level: Low

Group: Sales    Sophistication Level: Low

- ● Phishing Email Opened
- ● Phishing Link Clicked
- ◎ Phishing Page Loaded
- ○ User Interacting with Page
- ○ User Submitted Credentials

METHODS AND SYSTEMS FOR IMPLEMENTING A PHISHING ASSESSMENT

CROSS-REFERENCE TO RELATED APPLICATIONS

This application is a continuation of U.S. application Ser. No. 15/587,117, filed on 4 May 2017, which claims the benefit of U.S. Pat. No. 9,674,213, filed on 28 Oct. 2016, which claims the benefit of U.S. Provisional Application No. 62/248,031, filed 29 Oct. 2015, which are incorporated in their entireties by this reference.

TECHNICAL FIELD

This invention relates generally to the computer security field, and more specifically to a new and useful method and system for phishing risk analysis.

BACKGROUND

Computer security vulnerabilities come in all shapes and sizes; resultantly, computer security strategy must be varied and diverse to protect against exploitation of those vulnerabilities. Phishing is a particularly interesting challenge for computer security implementation because it is not solely a technological problem, as phishing relies on exploitation of a vulnerability not easily rectified—human fallibility.

While computer network users can be trained to recognize and report phishing attacks, it is difficult for such training to achieve learning retention levels necessary for a network to actually achieve sufficient protection from phishing-based attacks; after all, it is only necessary that for one user of the computer network to make a mistake for a phishing attack to succeed.

Traditionally, this problem has been addressed by performing phishing risk analysis. In such traditional methodologies, network administrators (or third parties) conduct phishing campaigns on network users to determine which phishing campaigns users may be most susceptible to, which users are highly vulnerable to such attacks, and other important information.

Unfortunately, generating sophisticated phishing campaigns is typically a highly manual process that requires either constant administrator involvement or contracting with an external firm (which can be costly and increase exposure). Thus, there is a need in the computer security field to create new and useful methods for phishing risk analysis. The embodiments of the present application provide such new and useful methods.

DESCRIPTION OF THE PREFERRED EMBODIMENTS

The following description of preferred embodiments of the present application are not intended to limit the inventions to these preferred embodiments, but rather to enable any person skilled in the art to make and use these inventions.

Figure 1:
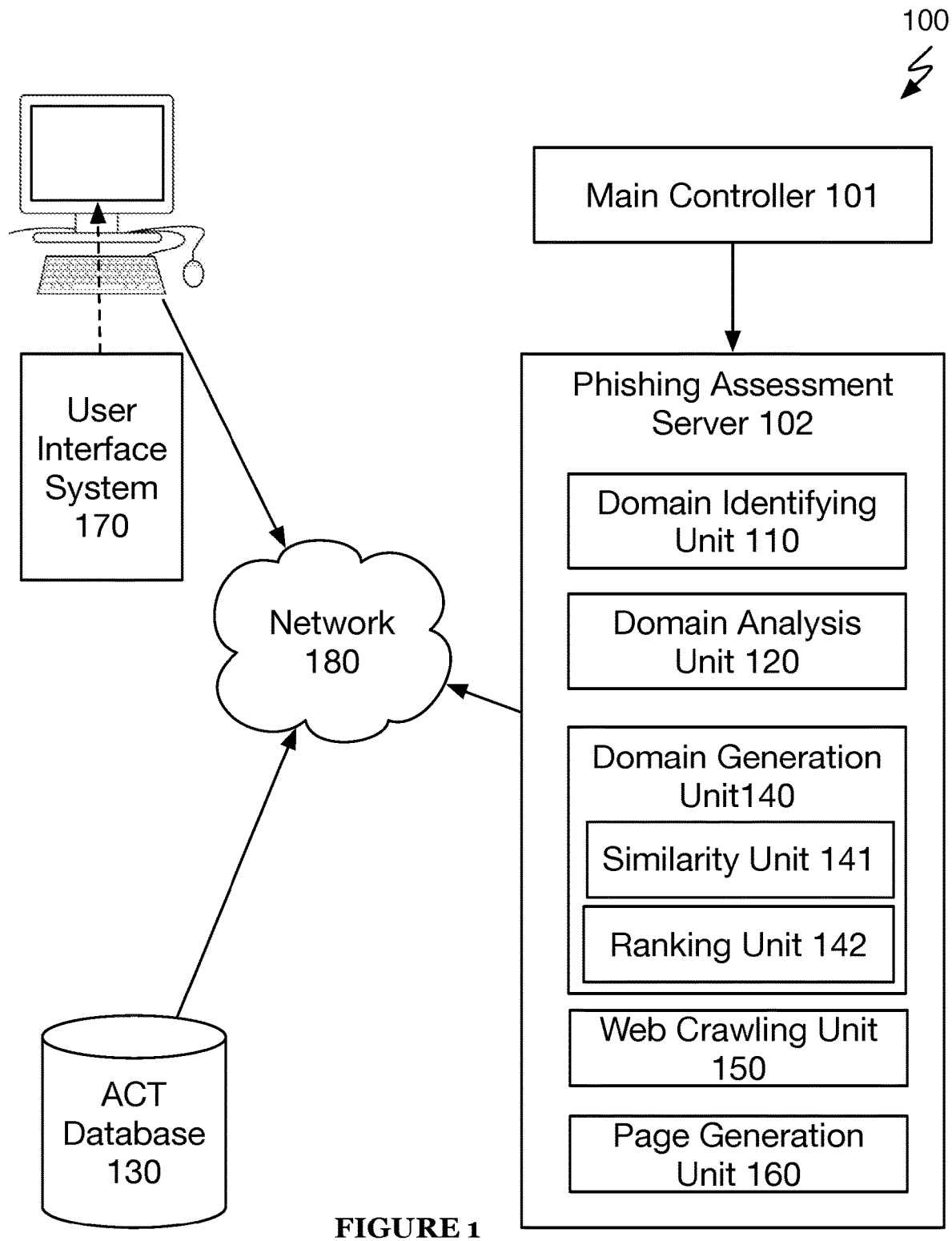
FIG. 1 illustrates a schematic representation of a system 100 of a preferred embodiment of the present application.

As illustrated in FIG. 1, a system 100 for implementing phishing risk analysis includes a phishing assessment server 102, target domain name identifying unit 110 (identifying unit 110), target domain name analysis unit 120 (analysis unit 120), auxiliary characters and TLD database 130, pseudo domain name generation unit 140 (generation unit 140), web crawling unit 150, fictitious web page generation unit 160 (page generation unit 160), user interface and input system 170, and network 180. Additionally, the generation unit 140 may include a domain name similarity determination (likeness) unit 141 and a pseudo domain name ranking unit 142.

Each of the units described herein including the identifying unit 110, analysis unit 120, generation unit 140, page generation unit 160, and the like include a computer processing unit (CPU), a processing circuit, microcontroller, or the like and alternatively, in some embodiments, are implemented by a CPU, processing circuit, microcontroller, or a main controller 101 that executes computer-executable code for performing the functions of each of the fore-mentioned unit components of the system 100. The main controller, in some embodiments, is a computer hardware component having a computing chip operable coupled to or in communication with memory. The main controller interfaces with and/or links one or more or all of the components or devices of system 100. In a preferred embodiment, the main controller controls or manages operations of each of the unit components and other devices operated by system 100. Additionally, in the embodiments when the processor or controller executes the computer code for implementing the respective unit components of the system 100, the processor or controller effectively mimics or functions as each of the respective unit components of system 100.

Additionally, and/or alternatively, each of the identifying unit 110, analysis unit 120, generation unit 140, and page generation unit 160 may be a separate component or element in system 100. However, it shall be understood that each of these unit components of system 100 may be part of a single component, such as the phishing assessment server 102 or software components of a main controller or computer processor.

The phishing assessment server 102 of a preferred embodiment automatically and/or semi-automatically implements one or more phishing campaigns or assessments on one or more computer networks, computer network users, and/or computer network devices. That is, the phishing assessment server 102, in such embodiment, is able to perform automatically and without human intervention some or all of the functions described herein and, especially, those described in each of the methods and processes disclosed in the present application. For instance, once a target entity is identified, the phishing server 102 in combination with the unit components and devices of system 100 (e.g., the phishing assessment platform) is able to identify a target domain name, generate pseudo domain names, rank and register one or more of the pseudo domain names, fabricate fictitious website for the pseudo domain names, and implement a phishing campaign or assessment.

Additionally, and/or alternatively, the phishing assessment server 102 may be an IT computer with functionality or sufficient computing ability to implement phishing assessments on a computer network. Additionally, and/or alternatively, the phishing assessment server 102 may be one of a plurality of computers and servers that form part of a target computer network or another network. In one variation, the phishing assessment server 102 is a central server operable to control, manage, and/or access one or more additional servers and computers existing one or more networks. Alternatively, phishing assessment server 102 may be distinct and independent from the target computer network. The target computer network of a preferred embodiment is the computer network that is subject to the phishing risk assessment. Accordingly, phishing assessment server 102 may be maintained and/or operated by an entity associated with the target computer network or maintained and/or operated by a third party service provider to the entity associated with the target computer network.

In a preferred embodiment, after receiving an identification of a target computer network, target user(s), and/or a target entity name for implementing the phishing campaign against, the target domain name identifying unit 110 is able to automatically or in response to, identify one or more target domain names to perform the phishing campaign against. For example, identifying unit no may receive from an IT administrator or the like, a target entity name, such as a target business name as input. In such example, using the business name, the identifying unit 110 is able to determine or identify a target domain name to assert the phishing campaign against.

In other embodiments, the identifying unit 110 may simply be provided with the one or more target domain names for which a phishing campaign is applied against. In this case, the one or more target domain names maybe pre-stored on a memory device accessible to the identifying unit 110. Additionally, and/or alternatively, the identifying unit 110 may receive as input the one or more target domain names from an IT administrator or the like that is authorized to implement a phishing campaign.

In the target domain name identification processes of the identifying unit 110, after receiving the target entity name or the like, the identifying unit 110 may search a number of different resources for identifying any and all possible domain names affiliated or otherwise, associated with the target entity. In particular, the identifying unit 110 identifies active domain having all, part, or a known abbreviated of the target entity name. The identifying unit no, if provided access, searches entity-maintained or provided resources, such as entity-servers and computer networks of the target entity to identify domain names associated with the target entity. Additionally, and/or in combination therewith, the identifying unit 110 may search the Internet and/or domain name registration sites to identify one or more domain names associated with or being used by the target entity or otherwise, associated with the target entity name.

The result of the identifying unit no's search of domain names may be the identification of one or a plurality of domain names which may be associated with the target entity or target computer network for the purposes of using one of these identified target domain names in a phishing campaign. In the case that there are a plurality or multiple domain names associated target entity or computer network that are discovered by the identifying unit 110, the identifying unit 110 determines a popularity of use of each of the identified plurality of domain names based on an aggregate number of visits and/or use of each of the plurality of domain names during a period of time. The identifying unit 110 may then identify a rank order for the plurality of domain names based on popularity and/or visits. The period of time may be any period of time in the past or an evaluation period of time in which the identifying unit 110 identifies a period of time in which the identifying unit no will measure the usage and/or visits to each of the plurality of domain names. From the evaluation period, the identifying unit 110 is able to determine aggregate usage and/or aggregate visits to each of the plurality of domain names and determine a ranking of the plurality of domain names based on these values. The identifying unit 110 of a preferred embodiment selects the top domain name of the plurality of identified domain names as the target domain name. Of course, it shall be understood that if the phishing assessment is a multi-domain name phishing assessment, then the identifying unit 110 would select the most popular domain names by rank for implementing the multi-domain name phishing assessment. A multi-domain name phishing campaign or assessment may be run simultaneously or sequentially. In a simultaneous multi-domain name phishing campaign, the multiple target domain names of the target entity are implemented in a phishing assessment at a same time. In a sequential multi-domain name phishing campaign, the multiple target domain names of the target are implemented in a phishing assessment in a sequential order and in some embodiments, the sequential order of implementation is based on rank or target domain name popularity.

Once the identifying unit 110 has identified and/or ranked the one or more domain names, the identified one or more domain names is shared or otherwise, becomes accessible to the target domain name analysis unit 120. For simplicity of explanation, the manner in which the analysis unit 120 processes a single identified domain name is described in the following; however, it shall be understood that any number of identified domain names may be analyzed by the analysis unit 120. The analysis unit 120 of a preferred embodiment analyzes one or more features and attributes of an identified domain name. In particular, the analysis unit 120 of a preferred embodiment analyzes each of the second-level domain (SLD) portion and the top-level domain (TLD) portion of the identified domain name to identify each of the characters in the SLD and TLD. For example, in the domain name: Example123.net/domain, the analysis unit 120 identifies each of the letters in the term "Example," each of the numbers "123," and the TLD "net," and also each of the letters in the suffix of the TLD, "domain." It shall be understood that the analysis unit 120 may analyze any portion of a URL including, but not limited to, the SLD, TLD, and pre-fixes and suffixes thereof.

Additionally, and/or alternatively, subsequent to or contemporaneously with the identification of the characters in the identified domain name, the analysis unit 120 further evaluates each of the characters in the SLD and/or TLD to determine whether or not the identified characters in the SLD and/or TLD has a known or recognized comparable character. The comparable character is a like or similar character that has an appearance comparable to an identified character in the SLD and/or TLD. For instance, the characters "vv" would be a comparable character for the letter "w." In many instances, if the characters "vv" has a substantially similar appearance to the letter "w" and thus, if the characters "vv" were substituted for the letter "w" in a term in a domain name, it would be very difficult to differentiate the two.

In the evaluation process of the identified characters in the identified domain name, the analysis unit 120 of a preferred embodiment compares each of the identified characters to one or more characters stored in auxiliary characters and TLD database (ACT database) 130 (e.g., pseudo domain name database) to determine whether any of the characters of the identified domain name has an associated visually similar corresponding character in the ACT database. Upon completion of the comparison, the analysis unit 120 transmit a communication to the pseudo domain name generation unit 140 indicating each of the characters in the identified target domain name which has a corresponding visually similar character within the ACT database 130 together with an indication of which visually similar characters in the ACT database 130 that corresponds to the characters in the target domain name. The ACT database 130 is, preferably, a database that includes characters including letters, numbers, and symbols (e.g., any character reproducible using an input device) that are electronically linked or otherwise associated with other and/or different characters which share a visual appearance that is similar. Depending on a selected or identified domain name transformation process, the visually similar characters which are electronically associated with original characters are used as substitutes for original characters appearing in a target domain name. The ACT database 130, in a variation, also includes common variations of words and/or characters that often appear in domain names. For instance, if the term "example" is a term that typically appears in domain names, the ACT database 130 will have one or more common variations of this term, such as example or exmaple. These variations would be stored in the ACT database 130 in order to more efficiently process a pseudo domain name generation request for frequently appearing terms in domain names.

Referring back to the example described above involving "Example123.net/domain," in the ACT database 130, the character "l" in the domain name may be linked or associated with the character "t" because these two characters share a visual similarity and when "t" is substituted into the domain name, upon brief visual inspection, the modified domain name Exampte123.net/domain looks the same as the original domain name. Similarly, the character "m" may be substituted with the linked or associated characters "rn" in the ACT database 130 and the character "a" may be associated or linked with the character "@" or the like. Each character may be associated with one or a plurality of visually similar other characters in the ACT database 130. Thus, the analysis unit 130 is able to input each of the identified characters of the identified domain name into a comparison process involving the data in the ACT database to determine character comparable or simply input into the identified characters into the ACT database 130 and comparable characters would be returned as output from the ACT database 130.

A similar process may, preferably, be employed for identifying comparable or substitute TLDs. In many cases, TLDs do not have visually similar TLDs. Rather, since the TLD is usually located at the end of a domain name, many TLDs may simply be substituted for other commonly used TLDs. Thus, in the case of identifying a substitute TLD for a TLD of an identified domain name, the analysis unit 120 may search the ACT database for the most commonly used TLDs other than the current TLD of the identified domain name. In some instances, the most commonly used TLDs in the ACT database 130 may be identified as TLDs with the highest global popularity (e.g., .com, .net, .org, and the like). In other circumstances, the most commonly used TLDs may be based on the entity type. For instance, for educational entities, the TLD .edu is often used; however, if the subject of a phishing campaign is an educational entity that is partly government funded, a most commonly used TLD may be .gov since many government-based entities use the TLD .gov. Thus, the analysis unit 130 may identify comparable or substitute TLDs based on, at least, these two basis.

Accordingly, after comparing each of the identified characters in the identified domain name, the analysis unit 130 identifies a comparable character for each of or one or more of the characters in the identified (e.g., target domain name) domain name. That is, a result of the analysis by the analysis unit 130 may be a catalog (e.g., SLD catalog) or list of each of or one or more of the characters in the identified domain name corresponding to one or more comparable characters from the ACT database. Similarly, a catalog (e.g., TLD catalog) identifying corresponding TLDs to the current TLD of the identified domain name may be provided. In some embodiments, the corresponding comparable characters and TLDs are ranked in the respective catalogs based on closest similarity to a character and/or TLD in the target domain name. This allows for generating more similarly appearing pseudo domain names at the pseudo domain name generation unit 140, as discussed in more detail below.

The pseudo domain name generation unit 140 is, preferably, configured to generate one or more fictitious or attack domain names (e.g., pseudo domain names) based on the identified target domain name. The pseudo domain names are, in this application, illegitimate domain names imitating legitimate target domain names. In particular, the target domain name in a preferred embodiment is provided to or received by the generation unit 140 and upon receipt or in response to the identification of the target domain name, the generation unit 140 continues to generate a list of pseudo domain names that could be used in a phishing campaign. In a preferred embodiment, the generation unit 140 generates the pseudo domain names based on an identification of the target domain name, an SLD catalog for the target domain name, and a TLD catalog for the target domain name.

In the pseudo domain name generation process, the generation unit 140 generates multiple iterations of pseudo domain names based on the identified target domain name. In some embodiments, the generation unit 140 modifies the target domain name to arrive at a pseudo domain name. In other embodiments, the generation unit 140 generates an entirely new pseudo domain name on the basis of the target domain name.

The pseudo domain name generation process at the generation unit 140 is preferably further based on one or a combination of domain name modification processes. Specifically, the generation unit 140 selects one or more of a homoglyph transformation process, TLD alternation/modification process, generic or service-specific prefix/suffix augmentation process, character repositioning and spacing, character transposition process, character deletion, and/or a combination thereof.

In the homoglyph transformation process implemented at the generation unit 140, the generation unit 140 transforms or modifies, mainly, the second-level domain portion of the target domain name to generate a pseudo domain name with one or more characters, mainly, in the second-level portion of the pseudo domain that that are not the same as corresponding characters in the target domain name, but that have a visually similar appearance such that when viewed at-a-glance the target domain name and the pseudo domain name appear visually the same. That is, the characters in the pseudo domain name appear to match 1-for-1 with the characters of the target domain name although the characters in the pseudo domain name are different than the characters in the target domain name. This type of homoglyphic domain name is achieved primarily by substituting at least one letter or character in the target domain name with one character or a character combination that appears to be visually similar to the at least one letter. Similar transformations can be achieved with several of the above-listed pseudo domain name generation processes.

The TLD alternation/modification process involves the substitution of the TLD of the target domain name with an alternative TLD or a modification of the TLD. For example, a TLD modification of example.com/html-1 may be example.com/html-2. In this example, the main portion of the TLD (e.g., com) is not change, however, one or more other characters in the TLD (e.g., change from html-1 to html-2) is changed. In many instances, the generation unit 140 uses characters and/or words in the pre-fix and suffix augmentation processing of a target domain name that would otherwise appear to be a natural extension of the original terms or characters in the second-level domain portion of the target domain name.

Implementing the generic or service-specific prefix/suffix augmentation process at the generation unit 140 primarily includes modifying the second-level domain portion of the target domain name; however, it should be noted that this process can easily be applied to the TLD of the target domain name as well. Specifically, in this process, the generation unit 140 adds one or more characters immediately before (e.g., pre-fix) the characters in the second-level domain portion or immediately after (suffix). For example, in an example target domain name, such as bankofamerica-.com, it would be a natural extension of the target domain name to add "onlinebanking" as a prefix because many target users may access the target domain name to login into online banking. The resulting attack domain name would, therefore, be onlinebanking-bankofamerica.com.

In the character repositioning and spacing processes, the generation unit 140 modifies the target domain name to change slightly the spacing or positioning of the characters in the target domain name. For instance, the generation unit 140 may add an underscore or dash in between recognizable terms within the target domain name. For instance, in the example target domain name bankofamerica.com, after processing at the generation unit 140, the resulting attack domain name would be bank_of_america.com or bank-of-america.com. Since the spacing is added between recognizable terms or real words, the medication appears to be natural.

In the character transposition process, two or more characters in a target domain name are transposed, such that the positions of the characters are merely switched or otherwise, moved around between the two or more characters. This kind of modification may be most effective when used with only two letters and preferably towards the middle or end of a domain name.

Character deletion involves deleting one or more characters in a target domain name. The generation unit 140, preferably, selections one or more characters in a target domain name for deletion that usually are not visually noticeable. For instance, in a target domain name, such as betterment.com, with one or more repeating letters, the generation unit 140 may delete one "t" resulting in beterment.com.

Referring back to the pseudo name generation process implemented by the generation unit 140, in some embodiments, the generation unit 140 generates a pseudo domain name by only replacing or modifying a single character in the target domain name. For instance, in the example domain name education.gov, the generation unit 140 may substitute, in a first iteration, the "t" in education.gov with an "1," resulting in pseudo domain name educalion.gov. In another iteration, the generation unit 140 may substitute only the "0" in education.gov with a "0" (a zero), resulting in the homoglyph, education.gov, which is virtually indistinguishable at a first glance from the original domain name. Further, the generation unit 140 in such preferred embodiment may only modify the TLD of a domain name by changing the example domain name education.gov to education.edu. Thus, the original TLD of .gov was changed to .edu. The single character pseudo domain name generation process may be based on the rankings provided in or by the SLD and TLD catalogs, such that the iterations of pseudo domain names first use the most visually similar characters to the original characters of a target domain name as identified in the SLD and TLD catalogs. A benefit of implementing a single character pseudo name generation process at the generation unit 140 is that a single character (or single TLD) substitution is more difficult to recognize as a fictitious domain name at an initial glance than a multiple character substitution or a multiple character and TLD combination substitution. Accordingly, the less that is changed in a pseudo domain name from an original target domain name the higher the similarity characteristics will be between the pseudo domain name and the original target domain name.

It shall be noted that while single character or single TLD substitution may be preferred, it is entirely possible for the generation unit 140 to perform multi-character substitutions or modifications for each iteration of pseudo domain names that the generation unit 140 generates. Thus, in the multi-character substitutions, the generation unit 140 is able to change, at least, two features of an original target domain name including at least two characters of the second-level domain name or at least one character of the second-level domain name and the TLD. The multi-character and TLD modifications and/or substitutions may be beneficial in the instance that all useful single character variations of a target domain name are registered, in use, or somehow restricted from use in a phishing campaign.

As previously mentioned, the generation unit 140 also includes the similarity determination unit (similarity unit) 141 and the pseudo domain name ranking unit (ranking unit) 142. The similarity unit 141 determines a similarity between at least two domain names and after comparing the at least two domain names, determines a fit score. The comparison of domain names at the similarity unit 141 is, preferably, between generated or provided pseudo attack domain name and a target domain name. It shall be noted, however, that the comparison at the similarity unit 141 can be between any distinct domain names including two or more generated or provided pseudo domain names or even, two or more legitimate target domain names. The fit score identified at the similarity unit 141 is provided or otherwise, accessible to the ranking unit 142 for the purposes of ranking the plurality of pseudo domain names generated at the generation unit 140.

The fit score may also be referred to herein as a phishing value where the phishing value indicates a determined probability or likelihood of successfully implementing a phishing attack on a target computer network or target user using an identified pseudo domain name. The probability of the phishing value may be indicated generally, as a high, intermediate, or low probability. In one variation, the probability of the phishing value may be indicated as a numerical or grade value, such as 68% or "C" or the like. In some embodiments, both a general probability and a numerical or grade value may be assigned to a pseudo domain name. It shall be understood that the probability of the phishing value may be communicated or determined in any form factor which indicates a value of a pseudo domain name as it relates to its use in a phishing assessment or phishing attack.

The probability of the phishing value may be determined in any manner including using statistical methods based on one or more tests involving the success rate of certain and/or different types of pseudo domain names.

The similarity unit 141, preferably, applies a number of similarity schemes against the pseudo domain names generated by the generation unit 140 to determine similarities between a pseudo domain name and a target domain name. Generally, in one or more of the similarity schemes, the similarity unit 141 identifies the target domain name and selects or is provided one or more pseudo domain names and compares the target domain name to each of the selected or provided pseudo domain names. Additionally, prior to or during the performance of the application of the similarity schemes, the similarity unit 141, identifies a number of characters in the target domain name and a number of characters in the pseudo domain name, a position (e.g., $1^{st}$, $2^{nd}$, $3^{rd}$, etc.) of each of the characters in the target domain name and the pseudo domain name, and the type of character at each position of the target domain name and the pseudo domain name. These identified characteristics of the target domain name and the pseudo domain name are useful characteristics that may be used in each of the similarity schemes.

According to a first similarity scheme applied to a pseudo domain name and target domain name, the similarity unit 141 determines a number of characters in both the target domain name and the pseudo domain name and if the number of characters match between the two, the similarity unit 141 proceeds to a subsequent similarity metric in the first similarity scheme. The number of characters identified in the target domain name is the base value B and the number of characters identified in the pseudo domain name is the non-base value NB. However, if the number of characters between the target domain name and the pseudo domain name does not match, the similarity unit 141 either calculates or measures the difference between the base value B and the non-base value NB for the target domain name and the pseudo domain name.

Using the variables identified above, one version of the similarity scoring or fit scoring algorithm would look like the following:

$$\text{Fit Score} = 100 - \left[\left[1 - \frac{B - [|B - NB|]}{B}\right] * 100\right]$$

As an example, in evaluating the target domain name example.com and the pseudo domain name examples.com, the similarity unit 141 determines that the base value for the target domain name is 11 (e.g., B=11) since there are a total of 11 characters in the SLD and TLD of the target domain. For the pseudo domain name, the similarity unit determined that the non-base value is 12 (e.g., NB=12). Applying these example values in the above fit score algorithm results in the following:

$$\text{Fit Score} = 90.91 = 100 - \left[\left[1 - \frac{11 - [|11 - 12|]}{11}\right] * 100\right]$$

Thus, for the example above, the resulting fit score is 90.91. In this example, the values for the fit score are in the range of zero (0) to one hundred (100) and any NB values causing the number of the quotient to be zero or a negative value automatically results in a fit score of zero (0). According to this example, the greater the fit score value, the greater the similarity between the pseudo domain name and the target domain name.

Additionally, and/or alternatively, in evaluating the similarity between a pseudo domain name and a target domain name, the determines whether any character in the pseudo domain name is a homoglyphic replacement for an original character in the target domain name. For instance, when the pseudo domain name is example.com and the target domain name is example.com, the similarity unit 141 would determine that the base value and the non-base values are the same for the two domain names. However, upon comparison of each individual character in each of the two domain names, the similarity unit 141 would determine that the single character "l" in the target domain name with a different character "I". For each substituted character (SB), the similarity unit 141 assigns the SB a value, such as one (i). Additionally, if the similarity unit 141 determines that the substituted character(s) in the pseudo domain name is also a homoglyph of the original character in the target domain name, the similarity unit 141 assigns a value of one to the SB together with a homoglyph multiplier (HM), such as five-tenths (0.5), where the value of HM is between zero and one. It shall be noted that the multiplier can be any dynamic or predetermined value between zero and one and may also depend on whether the homoglyph is in the SLD or the TLD. In some instances, if the homoglyph is in the TLD, the homoglyph multiplier is made smaller, such as 0.25, to account for the homoglyphic character being located later in the pseudo domain name, which allows for a greater similarity between the pseudo domain name and the target domain name.

Using the variables identified above, a second version of the similarity scoring or fit scoring algorithm would look like the following:

$$\text{Fit Score} = 100 - \left[\left[1 - \frac{B - [|B - NB|] - SB * HM}{B}\right] * 100\right]$$

Applying the above values in the second fit score algorithm results in the following:

$$\text{Fit Score} = 95.45 = 100 - \left[\left[1 - \frac{11 - [|11 - 11|] - 1 * .5}{11}\right] * 100\right]$$

Accordingly, the fit score for the single character homoglyphic transformation of the target domain name, example-.com, results in a higher fit score of 95.45; meaning that the pseudo domain name example.com has a higher similarity to the target domain name than the pseudo domain name examples.com.

Additionally, and/or alternatively, in evaluating the similarity between a pseudo domain name and a target domain name, the determines whether any characters in the pseudo domain name are transposed. For instance, when the pseudo domain name is examlpe.com and the target domain name is example.com, the similarity unit 141 would determine that the base value and the non-base values are the same for the two domain names. However, upon comparison of each individual character in each of the two domain names, the similarity unit 141 would determine that the two characters "l" and "p" are merely transposed. For each out of position character (P), the similarity unit 141 assigns the P a value, such as one (i). Thus, the P value in this instance would be two (2) since there are two characters which are not in their original positions, as determined by the target domain name. Additionally, if the similarity unit 141 determines that the out of position characters in the pseudo domain name are simply transposed based on the original characters in the target domain name, the similarity unit 141 assigns a transposition multiplier (TM) to the P value, such as five-tenths (0.75), where the value of TM is between zero and one. It shall be noted that the transposition multiplier can be any dynamic or predetermined value between zero and one and may also depend on whether the transposition is in the SLD or the TLD. In some instances, if the transposition is in the TLD, the transposition multiplier is made smaller, such as 0.25, to account for the transposed characters being located later in the pseudo domain name, which allows for a greater similarity between the pseudo domain name and the target domain name.

Using the variables identified above, a second version of the similarity scoring or fit scoring algorithm would look like the following:

$$\text{Fit Score} = 100 - \left[\left[1 - \frac{B - [|B - NB|] - SB*HM - P*TM}{B}\right]*100\right]$$

Applying the above values in the second fit score algorithm results in the following:

$$\text{Fit Score} = 86.36 = 100 - \left[\left[1 - \frac{11 - [|11 - 11|] - 0*0 - 2*.75}{11}\right]*100\right]$$

Accordingly, the fit score for the transposed characters in the pseudo domain name, results in the lowest fit score of 86.36; meaning that the pseudo domain name examlpe.com has a lower similarity to the target domain name than the pseudo domain names examples.com and example.com.

It shall be understood that the above example similarity score or fit score algorithms may be modified to take into account any kind or type of transformation applied to a target domain name to arrive at a pseudo domain name. Thus, the fit score algorithm should not be limited by these examples. For example, the fit score algorithm may be modified to take into account domain name transformations that involve adding pre-fixes and suffices, repositioning and spacing, and/or the like. In such modifications, it would be possible to add one or more variable in the numerator of the quotient portion of any of the above examples of a fit score algorithm to properly capture the changes in similarity introduced by any additional transformation process.

The pseudo domain name ranking unit 142, preferably, analyzes the fit scores for each of the pseudo domain names and ranks each of the pseudo domain names accordingly. The pseudo domain names may be ranked according to a pseudo domain name ranking spectrum and/or pseudo domain name ranking continuum which illustrates a relative similarity position of each of the pseudo domain names along a range of value or the like. The ranking spectrum and/or ranking continuum may be visually illustrated via a display or the like. In this way, if the illustration is presented to an administrator, the administrator is able to easily determine the relative similarity of each of the pseudo domain names and make a selection of a pseudo domain name, accordingly. In the above examples, the higher the fit score, the greater the similarity. Thus, taking into account the three examples above, the ranking unit 142 would rank the pseudo domain names in the following order:

1. example.com
2. examples.com
3. examlpe.com

In this ranking example by the ranking unit 142, the pseudo domain name at the top which follows 1. would be the most similar to the target domain name example.com and examples.com would be the second most similar to the target domain name. By ranking the pseudo domain names, allows for the administrator or the autonomous system to readily identify and select the most similar target domain names which would allow for a phishing campaign with an increased difficulty.

Additionally, the web crawling unit 150 of system 100 is configured to search the web and/or intranet of an entity to identify one or more web pages and record/copy the one or more features and attributes of the web page. Specifically, upon receipt or based on an identification of a target entity/organization by the identifying unit 110 or otherwise, the web crawling unit 150 identifies the web presence of the target entity in order to identify the one or more web pages, social media pages, intranet pages, and other related pages that are associated with the entity or a target domain name of the entity. Accordingly, the web crawling unit 150 of a preferred embodiment is able to automatically discover many or all of the web pages associated with an identified target entity name. Thus, it is also possible that the web crawling unit 150 uses one or more target domain names of the target entity to identify the web presence of the target entity. Similarly, the web crawling unit is able to identify a web presence of one or more affiliates and/or service providers of the target entity and perform the same functions against the web pages associated with each of the affiliates and/or service providers.

Once the web crawling unit 150 identifies the web presence of the target entity, the web crawling unit 150 evaluates the one or more web pages associated with the target entity and captures the features and/or attributes of the one or more web pages. Thus, the web crawling unit 150 is able to copy all of the content, graphics, illustrations, formatting, code, and other features and attributes of the one or more web pages. Subsequently, the web crawling unit 150 transmits to and/or stores the copied content in a datastore accessible to or otherwise, that is a part of the system 100. In this way, the copied content can be used and/or evaluated by the fictitious web page generation unit 160. Additionally, and/or alternatively, the web crawling unit 150 automatically provides the copied content directly to the fictitious web page generation unit 160 for processing.

The fictitious or pseudo web page generation unit 160 (page generation unit 160) is configured to generate one or more fictitious and/or pseudo web pages, preferably, to be used in a phishing campaign. In particular, the page generation unit 160 is able to access the web page content of the one or more web pages associated with a target entity or target domain name that is stored in the datastore and automatically generate one or more fictitious web pages that mirrors or substantially matches the one or more legitimate web pages of the target entity. In the page generation process, the page generation unit 160 will substitute the original target domain name of the target entity and replace the target domain name with a pseudo domain name that was generated by the pseudo domain name generation unit 140 or otherwise, provided by an administrator of the phishing campaign.

In a variation of the fictitious domain name generation process, the page generation unit 160 is able to use portions of copied content of multiple legitimate web pages of the target entity to generate a new and non-copy fictitious web page to be used in a phishing campaign. Similarly, the page generation unit 160 is able to associate the generated, non-copy fictitious web page with at least one pseudo domain name generated at the pseudo domain name generation unit 140 or otherwise, provided to the page generation unit 160.

An administrator or the like is able to use the user interface and input system 170 to configure, monitor, and manipulate one or more phishing campaigns. A user interface of system 170 includes a display, such as one or displays and/or one or more touch panels, which are, preferably, used to implement and monitor a phishing campaign. The system 170, additionally, and/or alternatively includes one or more additional input and output devices that are used for interacting with the components of the system 100 and preferably, for managing the phishing campaign.

Figure 2:
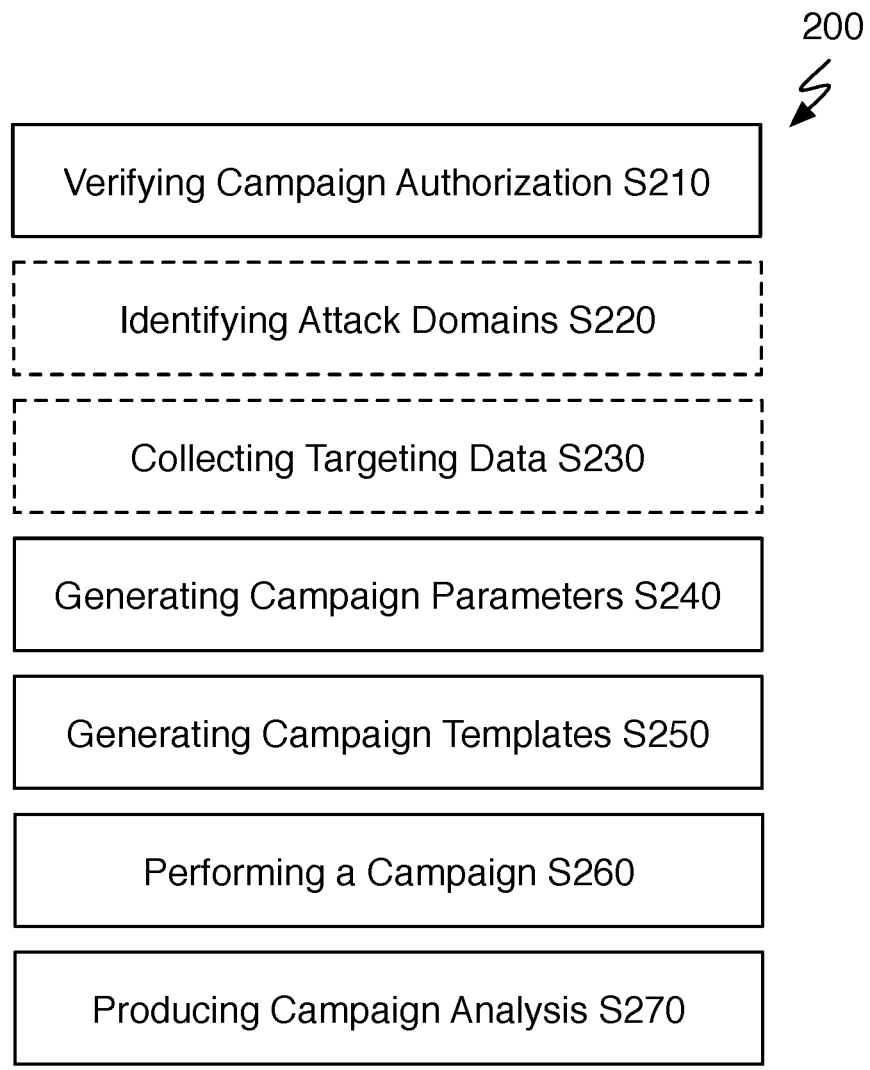
FIG. 2 is a chart view of a method 200 of a preferred embodiment of the present application.

As shown in FIG. 2, a method 200 for phishing risk analysis includes verifying campaign authorization S210, generating campaign parameters S240, generating campaign templates S250, performing a campaign S260, and producing campaign analysis S270. The method 200 may additionally include identifying attack domain names S220 and/or collecting targeting data S230.

As described in the background section, while solutions for phishing campaign generation exist, they are typically lacking in either or both of automation level and sophistication. The consequence of this is that traditionally generated phishing campaigns simply aren't effective either in gauging risk to real-world phishing attacks or in providing any defense against them.

The method 200 functions to make it easy for network administrators to generate sophisticated phishing campaigns; the method 200 also provides powerful analytical tools to enable companies and organizations to not only assess, but also reduce phishing risks and thereby reduce vulnerabilities in associated computer networks.

The method 200 is preferably enabled by a web-based software platform (e.g., phishing assessment platform) operable on a web server or distributed computing system. Additionally, or alternatively, the method 200 may be performed by any suitable computer system capable of generating, launching, implementing, and analyzing phishing campaigns. The method 200 includes step S210 for verifying authorization for conducting a phishing campaign.

S210 includes verifying campaign authorization. In some embodiments, S210 functions to verify that an entity system or computer is authorized to autonomously implement a phishing campaign. While in some instances an administrator or the like assists in the implementation of a phishing campaign, it is also possible for an entity or organization to specifically designate an entity server, computer, or the like that is able to automatically and autonomously implement a phishing campaign without any human intervention. In such cases, S210 determines whether or not the entity server has any and/or all permissions, privileges, and access rights required for implementing the phishing campaign.

Additionally, and/or alternatively, S210 functions to verify that a campaign administrator (i.e., a user of the method 200 who manages a phishing campaign operable on some domain) is authorized to perform a phishing campaign using one or more computing systems on an entity's computer network. Although phishing campaigns conducted via the method 200 preferably do not store phished credentials or expose these credentials to campaign administrators, unauthorized campaigns may still have the potential to be disruptive to an organization's operations. Resultantly, the method 200 preferably verifies that a campaign administrator or an autonomous entity computing system is authorized to perform a phishing campaign via S210.

S210 is preferably performed on a per-domain basis (i.e., authorization must be verified for each domain on which phishing campaigns are to be performed); but may additionally or alternatively be performed in any manner. By, preferably, requiring verification on a per-domain basis, allows for a better or stricter control of a phishing campaign as only those approved or verified domains may be used in the phishing campaign. For example, S210 may be performed on a sub-domain basis. As another example, S210 may be performed for a set of IP addresses; e.g., if a set of IP addresses is associated with an organization, authorization may be granted for any domains associated with those IP address as determined by trusted DNS records.

Authorizations granted in S210 are, preferably, temporary in duration and thus, may expire (and/or require reauthorization) according to a predetermined time schedule or any time schedule. For example, authorization granted via S210 may last only for one week. Temporary authorizations are also a control parameter for the phishing campaign used to control a duration thereof. Additionally, by providing for expiring authorizations in S210, reduces the likelihood that one or more administrators will exceed the scope of the assessments required in the phishing campaign.

Additionally, and/or alternatively, authorization granted in S210 may also have limits. These limits may be predetermined or determined situationally based on the campaign administrator or entity campaign system or preferably based on factors which affect a quality of a phishing campaign. For example, a campaign administrator may be authorized only to perform phishing campaigns over email and not via text message. In this example, the phishing assessment is limited to email attacks only to control a quality of the phishing campaign because it is possible that users of the computer network being tested in the phishing campaign become suspicious of a phishing attack due to the multiple communications initiated by the campaign. It shall be noted, however, that in some circumstances that dual or multiple phishing assessment communications enhances a quality of a phishing campaign depending on the nature of the communications.

Both authorization limits and expiration settings may be determined in any manner. In one example, authorization limits and/or expiration settings are determined automatically on the basis of authorization verification level (discussed in more detail below).

S210 may include verifying campaign authorization in a number of ways. For example, S210 may include verifying campaign authorization by a primarily manual process; e.g., a service representative for a security company (running a software platform implementing the method 200) may verify a campaign administrator by visiting a company and confirming with the company's head of human resources that the same company's head of information technology is authorized to perform a phishing campaign on the company's computer network. In such a situation, a trusted or verified contact within a company or organization could provide not only authorization but also authorization limits/expiration for a phishing campaign. In very large companies, this manual process may be time consuming due to large human resource departments, multiple office locations, and generally a decentralized decision-making or employee information confirmation process. Thus, a less manual process for verifying authorization of a campaign administrator, as described in more detail below, may be more suitable for an efficient and more streamlined verification process.

Thus, S210 may alternatively verify campaign authorization using a semi-manual process. In the semi-manual process, many of the traditional verification steps in the verification process may be automated or the manual verification process may be augmented with one or more automated steps that reduce the requirements of one or more of the manual verifications steps. For example, S210 may include requesting that a potential campaign administrator demonstrates domain management/access credentials. This verification may be accomplished in a form of a test of the administrator's management/access credentials of a target computer network. In one instance, S210 may include verifying that a particular piece of data (e.g., a string, a code, a number, a particular image, etc.) has been placed in a location that demonstrates domain-level access; such as inserting something into a DNS record, or modifying a company's website (e.g., by placing a special html page at domain.com/verify.html, or by inserting some JavaScript into a homepage). The request to the potential administrator is not limited to these examples. The request to the potential campaign administrator may be a request that sufficiently demonstrates the typical management and/or access controls expected of an IT administrator with sufficient computer network authorizations to properly implement a phishing campaign. The request may be sent in the form of an electronic communication, such as email. If a particular email address is known to be associated with a person of access (e.g., admin@domain.com), a verification code or link may be sent to that email address. While email is a generally acceptable manner to communicate the authorization verification request, it is possible to use any form of electronic communication, such as chat, text messaging, and/or related work communication applications.

Additionally, and/or alternatively, S210 may verify campaign authorization using an automatic verification process. In the automatic verification process, S210 may use one or more profiles or the like associated with a prospective campaign administrator to confirm and/or verify the administrator's credentials. The one or more profiles may be any kind of profile having biographical, business, and/or personal information about the administrator. These one or more profiles of the administrator include, but is not limited to, a company profile, business profiles, social media profiles, and/or social network profiles. For example, by accessing a potential campaign administrator's social network profile (e.g., LinkedIn profile) after verification of the campaign administrator's identity via email address or another authentication process, such as "Connect with LinkedIn". After accessing the social network profile, S210 may retrieve data about the potential campaign administrator (e.g., title, department, number of connections within the organization, titles of connections within the organization, length of employment, etc.) which can be analyzed to determine if a potential campaign administrator is authorized to perform a phishing campaign. In the analysis, it may be determined that the aggregate of the information about the administrator is sufficient such that a reasonable entity would identify the administrator as being authorized to conduct the phishing campaign. In such instance, the data and/or information about the administrator may be compared against a predetermined checklist of data that includes a plurality of items which are typically associated with an administrator with proper authority to conduct a phishing assessment. In the analysis, if the data and/or information about the administrator sufficiently matches the plurality of items in the predetermined checklist or predetermined specifications then the administrator is determined to be authorized and the phishing assessment is approved. In some instances, the data and/or information must achieve a minimum match level of greater than 50% of the items and in other instances, the administrator's information must match a supermajority (e.g., 67% or the like) of the items in the checklist. It shall be understood that the degree to which the administrator's profile information matches the predetermined checklist can be set at any amount that indicates sufficient authority to implement, conduct, and/or manage a phishing assessment.

Similarly, an automatic process employed by S210 may include retrieving data from any platform capable of providing information that a potential campaign administrator may be authorized to perform a phishing campaign. For example, S210 may include accessing a set of web applications, such as Google Apps, data to confirm that a particular potential campaign administrator is an administrator of the Google Apps account associated with the organization's domain. In such automatic verification process, an administrator's management/access rights to particular applications or target computer network components is compared against a predetermined list of typical application and/or computer network components which an approvable administrator should have. The automatic verification process approves the administrator when one or more of the administrator's current management/access rights matches one or more items within the predetermined specification. As another example, a company's website may be scraped to retrieve data about a potential campaign administrator. If the retrieved data about the potential campaign administrator indicates the appropriate titles, relationships, and/or authorities typically associated with an administrator authorized to perform a phishing campaign, then the automatic verification process approves the potential campaign administrator. Of course, in any of the above-mentioned processes, if the administrator's information does not sufficiently match items within the predetermined checklist or predetermined specification list(s), then the process does not approve or declines to approve the prospective administrator for implementing the phishing campaign.

Note that some of the processes described above are binary (e.g., a potential campaign administrator either enters the correct code from an email or he/she doesn't), and some are non-binary (e.g., a potential administrator has a LinkedIn profile with some set of characteristics as described above. S210 may include performing authorization with any number of the aforementioned processes (or any suitable verification processes). For example, if S210 includes performing authorization solely using binary authorization processes, a threshold number of said processes may need to be completed successfully. In another example, if the potential administrator is responsible for managing computer networks and systems with highly sensitive information, it may be necessary to perform a combination of the forementioned automatic processes to ensure that a comprehensive check of the potential administrator's credentials is performed.

As another example, S210 may include generating an authorization score. The authorization score provides an indication of a level of authorization of a potential administrator. The authorization score may be a numerical value (e.g., 89) or some other value (e.g., A-E) in a range of predetermined values associated with one or more levels of authorization. In a preferred embodiment, a potential campaign administrator's authorization score must equal or exceed predetermined or dynamic threshold level for a particular authorization level. Note that as previously mentioned, authorization may have limits; resultantly, a set of authorizations with different limits may comprise authorization levels (e.g., unlimited authorization may be at a higher authorization level than authorization for a particular domain). Thus, in some embodiments, higher authorization scores correspond with higher authorization levels and lower authorization scores correspond with lover authorization levels. Likewise, expiration conditions may be affected by authorization level. Accordingly, an authorization continuum having a range of authorization levels may be provided in which each of the authorization levels within the authorization continuum correspond with an authorization score and have a corresponding authorization limits and a corresponding authorization expirations in a related limits continuum and in a related expirations continuum, respectively.

Such an authorization score would preferably be determined by assigning weights and/or scoring algorithms to each process contributing to the authorization score. For example, a potential campaign administrator may need a score of 70 to receive authorization at a particular level. Verifying that the campaign administrator is a Google Apps administrator may result in a score of 50, while data from the admin's LinkedIn Profile may be determined by scoring algorithm; e.g., $$C\left[10L + \frac{N}{10}\right]$$

where C is one (1) if the profile indicates the admin is employed at the organization and zero (0) otherwise; L is 1 if the admin has been employed over two years and 0 otherwise; and N is the number of connections the admin has within the company that are older than six months. Thus, the total authorization score algorithm might look like $$50G + C\left[10L + \frac{N}{10}\right]$$

where G is simply a binary variable indicating verification of Google Apps administrator access.

In a preferred embodiment, the admin's control or management of the suite of web applications, such as Google Apps, maybe afforded greater weight since the control and/or management of such entity web applications provides a greater indication of the admin's authority within an entity with respect to IT matters and further, because the control and/or management of such entity web applications is more likely to be readily verifiable whereas some aspects of social media data from a admin's profile that are usually strictly within the admin's control and therefore, subject to unverifiable manipulation. However, it shall be noted that depending on the type of profile used for the admin, a different and additional weight may be afforded which equals or is greater than the weight afforded to IT-related functions and managements (e.g., Google Apps or the like). For instance, if the profile type of the administrator used in the verification process is a company profile, possibly provided by HR or available on the company's internal or external web pages, in those circumstances where the information within the company profile is most likely provided by and/or managed by someone other than the administrator, the verification value and/or weight of such profile type is greater than a social media profile of a user, for example.

S220 includes identifying attack domain names (e.g., pseudo domain names). An attack domain name, in this case, is a domain name that is used in phishing and specifically, to attack users of a computer network and/or to attack the computer network, itself. Thus, in S220, one or more attack domain names are determined and in various manners for the purpose of misleading one or more users. While in some cases phishing may occur from within an organization's domain (e.g., if a low-level email account is comprised and used to perform a targeted phishing attack on other targets within the domain), phishing typically occurs from an external domain other than an internal domain that belongs to or is registered by the organization. Accordingly, the external domain name is a domain name that is not registered as belong to a target computer network of a target entity/organization. To trick phishing targets into trusting content from external domains, phishers may either attempt to hide any information related to the external domain (e.g., by using misleading HTML links, by using JavaScript to alter a browser's address bar, etc.) or by making the external domain itself appear to be legitimate although the external domain name is not legitimate. To give off the appearance of legitimacy, phishers commonly use look-alike domain names. As the name suggests, a look-alike domain name is an illegitimate domain name that looks like a legitimate domain name. For example, a phisher may user the look-alike and illegitimate domain name "bankfoamerica.com" instead of the legitimate domain name "bankofamerica.com" (note that the letters in the term "of" from the legitimate domain name is transposed in the former). As discussed earlier, the generation unit 140 is programmed or otherwise, capable of generating such attack domain names using a transposition process applied to a target domain name or based on the target domain name.

Look-alike domain names may be formed in a number of ways, including intentionally misspelling domain names (as above), changing top-level domains (TLDs) (e.g., "company.org" instead of "company.com"), adding generic prefixes or suffixes (e.g., "company-login.com" instead of "company.com" or "login.company.com"), adding service specific prefixes or suffixes (e.g., "vpn-company.com" instead of "vpn.company.com"), and using any combination of the fore-mentioned. In particular, look-alike-based domain names used in phishing attacks may use domain names exploiting homoglyphs (sets of characters that look similar but are not). In a relatively simple example of a homoglyph exploiting domain, "google.com" may be used instead of "google.com" (note that the two '0's have been replaced by zeroes in the former). Thus, the homoglyph attack domain name using the zeroes looks like the legitimate domain name. Slightly more advanced is a multi-letter homoglyph: e.g., vvave.com vs. wave.com. The most advanced homoglyphic exploits surround the Unicode character set, which contains many strongly homoglyphic characters. For example, in most fonts, the Greek letter 'A', the Cyrillic letter 'A', and the Latin letter 'A' are visually identical. As another example, the Simplified Chinese variant of a particular character is often homographic with the Traditional Chinese variant. These type of homoglyphic and homographic variants of legitimate domain names are very difficult to identify by a user even when the attack domain name is read or studied carefully. Thus, homoglyphic and homographic attack domain names can be very useful in a phishing campaign.

Figure 3:
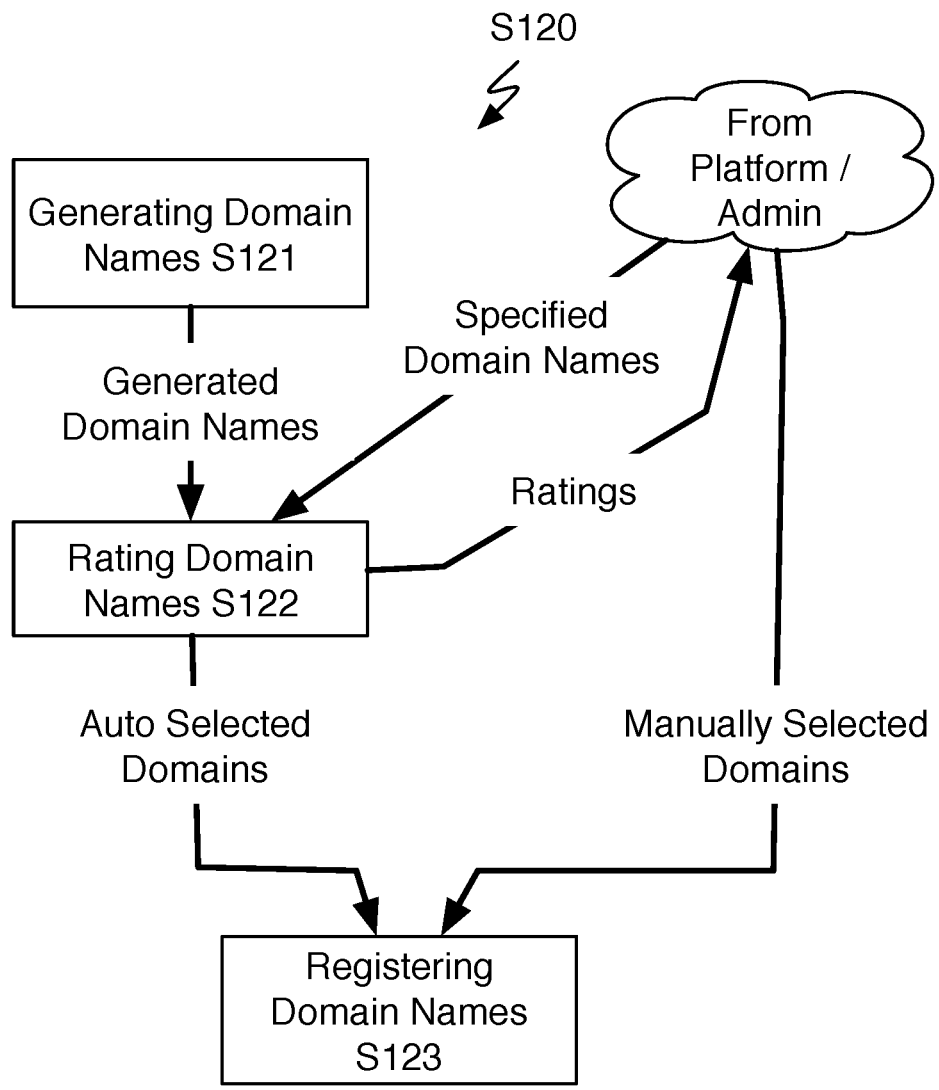
FIG. 3 is a chart view of a step of a preferred embodiment.

S220 functions to generate, rate, and/or register attack domain names with a reasonable likelihood and/or probability that they may trick or confuse phishing targets into trusting content presented by those attack domain names (and/or may bypass filters or other security measures present on a network). As shown in FIG. 3, S220 may include generating phishing domain names S221, rating phishing domain names S222, and registering phishing domain names S223. Alternatively, S220 may include any sub-combination of these steps.

S221 includes generating phishing domain names. S221 functions to generate attack domain names based on a target domain name (i.e., a name of a domain targeted by the phishing campaign). S221 preferably includes generating phishing domain names by modifying the target domain name with alternate TLDs, homoglyphs, generic prefixes/suffixes, and/or service-specific prefixes/suffixes. Other subtle methods for generating domain names include transposition of letters of a target domain name, adding non-letter characters (e.g., dashes, underscores, or the like) between characters of a target domain (especially between distinct words, e.g., bank-of-america), abbreviating a target domain name using well-known acronyms or short names of an entity (e.g., bankofamerica.com to bofa.com), and the like. S221 may additionally or alternatively include modifying the target domain name in any manner, or generating domain names in any suitable manner (e.g., by a method other than modifying the target domain name, such as modifying a different domain name like "Microsoft.com"). In such a case, domains specifically associated or assigned to the target entity may not be modified, but instead, domain names of services or common services providers of the entity may be modified in an illegitimate manner to generate a phishing domain name. Thus, in S221, the generation of a phishing domain name is not limited to generating phishing domain names based on domain names expressly affiliated with the target entity of the phishing campaign.

S221 preferably includes determining that generated domain names are available, so that a list of phishing domain names provided to S222 is actionable. In this instance, S221 compares one or more phishing domain names in the list of generated phishing domain names to domain names listed in a registry or otherwise, inputs each of the listed phishing domain names in a registry service to determine whether or not the listed phishing domain name is registered or actively being used by another. If, after the comparison of the phishing domain names with a registry or the like is completed, S221 provides a new list of only the phishing domain names which are not registered for the purpose of implementing one or more of the newly listed phishing domain names in a phishing campaign.

Additionally, or alternatively, S221 may provide a list of phishing domain names without verifying availability. In some instances, by not verifying availability of the phishing domain names on the list, expedites the phishing campaign implementation process since the availability verification process may be a time consuming step in the phishing domain name generation process. However, an obvious drawback in failing to verify the availability of a phishing domain name is that the phishing domain name, if selected for a phishing campaign, may not be available and thus, may set back one or more subsequent steps required for implementing a phishing campaign including creating a phishing website based on the selected phishing domain name.

S222 includes rating phishing domain names. S122 functions to rate phishing domain names generated in S221 or provided from another source (e.g., manually specified by the campaign administrator). A purpose for rating the phishing domain names is to provide an indication of probable effectiveness for misleading or tricking a target. A benefit of performing the rating in S222 is the ability to scale the difficulty of a prospective phishing campaign. For instance, if a phishing domain name is highly rated, the more likely that the phishing campaign will be difficult for a target to identify, whereas if the phishing domain name is not highly rated, then the more likely that at least some users will identify the phishing domain name as a fictitious domain name used for phishing information. By scaling the difficulty of a phishing campaign based on the ratings provided in S222, an administrator or the like may be able to perform controlled experimentation based on the phishing domain names for the purpose of studying targets affected or tricked in terms of percentages or the like and further, associate resultant experimental values with the ratings. This type of information can be insightful with respect to the configuration of a subsequent phishing campaign and further, for refining the phishing campaign generation process.

S222 preferably includes rating phishing domain names according to a metric that specifies how valuable the names are for a phishing campaign. Additionally, and/or alternatively, the rating metric may indicate a probability or a likelihood that a target would be tricked or mislead by a rated phishing domain name. This metric is preferably calculated for a generated domain name (or a specified domain name) according to visual similarity between the targeted domain name and the generated domain name. (or specified domain name). Although other factors including phonics of the generated domain name may also be taken into account in determining a rating, the primary test used for determining a rating for a generated domain name is visual similarity.

Additionally, or alternatively, S222 may include rating domain names on any attributes; for example, S222 may include rating domain names on a metric that includes both a similarity score based on visual similarity or the like and a 'fit' score; wherein the fit score represents how well a given domain name fits the image of the targeted organization (e.g., as calculated based on text available on the organization's website). The fit score of a domain name may be determined in a number of different manners, as described above with respect to system 100.

The ratings provided by S222 are preferably provided to the campaign administrator (e.g., in a GUI that lists domain names evaluated by S222) or a phishing computing system autonomously implementing the phishing campaign. From there, the campaign administrator may register domain names manually, or may authorize the method 200 to register selected domain names automatically. In the case of the phishing computing system, the system may automatically determine whether or not the domain name is available, register the domain name if available, and generate a phishing campaign based on the domain name.

Additionally, or alternatively, the list of ratings and associated domain names may be provided by S222 directly to S223. S223 functions to automatically register the domain names on the list associated with the top or high ratings. In this way, a campaign administrator's intervention is not required for the purpose of selecting a domain name for a phishing campaign. This automation of the campaign generation process clearly provides a benefit of improving an efficiency for implementing the phishing campaign.

S223 includes registering one or more of the generated domain names. S223 functions to register domain names selected either automatically as a result of ratings generated in S222 or manually as a result of campaign administrator selection. S223 preferably includes registering domain names at a domain name provider using an API, but may additionally or alternatively register domain names in any manner. In addition to registering domain names, S223 may include any preparation of the domain name (e.g., updating DNS records to point to a phishing campaign site, etc.).

In a variation of a preferred embodiment, S223 may provide information useful in domain name registration (as opposed to completing domain name registration). For example, S223 may open a domain name registration website with pre-populated forms. The pre-populated forms, in this embodiment, includes the selected domain names and any or most information required for registering the domain name and associated said domain name with the phishing campaign. S223 may provide, in associated with or included in the pre-populated forms, instructions beyond the pre-populated form for registering the domain name and/or submitting the pre-populated form for the purpose of registering the domain name. This may be very helpful in the case that the domain name service provider or registration service limits the amount of automation used in its registration process. Thus, by including registration instructions in or in associated with the pre-populated form, an administrator can easily negotiate the registration process and proceed with implementing the phishing campaign.

S230 includes collecting targeting data. S230 functions to collect data about a target organization's web presence (e.g., website, publicly available data, social media presence, etc.) and/or about web presences of individuals associated with the organization. The targeting data collected can include any data, and not solely web presence data, about the organization and/or individuals associated with the organization. For instance, the data collected at S230 may include internal data, such as data available on the organizations intranet, data provided by the administrator, and data that is not electronic data (e.g., physical documents and the like) but that may be converted into a useable electronic form. This data could be used to generate one or more campaign control and configuration parameters (e.g., how a campaign is run) in S240 and/or campaign templates in S250.

S230 preferably includes collecting targeting data using a number of methods and via a number of sources, but may additionally or alternatively collect targeting data through a single method and a single source. Examples of targeting data collection include scraping organizational websites and/or websites owned by individuals associated with an organization, scraping websites of service providers and/or affiliated partners/collaborators of the organization, retrieving social media data (e.g., an organization's LinkedIn/Facebook pages, LinkedIn/Facebook profiles of employees, the organization, and the like). S230 preferably includes collecting publicly available data, but may additionally or alternatively includes collecting private data. For example, S230 may include receiving internal company organizational data, as noted above.

S230 preferably includes collecting targeting data by retrieving target data from web platforms, but may additionally or alternatively include collecting targeting data provided by campaign administrators directly. For example, the internal company organizational data of the last paragraph may be pulled automatically from a Human Resources program (with authorization), a human capital database within the organization or it may be supplied directly by campaign administrators, etc.

Targeting data preferably includes general information about the organization (e.g., organization type, size, style) as well as information about individuals within the organization (e.g., names, roles, connections, contact information). Additionally, and/or alternatively, targeting data includes information about entities or other organizations that are affiliated/partnered/collaborated or otherwise, provide a service to the targeted organization. Targeting data may additionally or alternatively include any data capable of aiding in phishing campaign generation. For example, S230 may include collecting data about the services used by an organization, as described in U.S. Provisional Application No. 62/138,197, the entirety of which is incorporated by reference.

S230 preferably includes collecting targeting data automatically based on one or more of the organization's domain names and/or one or more of the domain names of an affiliated entity or service provider to the organization, but may additionally or alternatively include collecting targeting data via any parameters. For example, a campaign administrator may specify that a particular website provides login to a corporate intranet, while another website provides login to webmail, etc.

In one implementation, at least some of the targeting data is collected during campaign authorization (S210). For instance, preliminary targeting information about the organization may be necessary, as base information, for initializing one or more of the automatic or semi-automatic search and collection processes for targeting data. For instance, base information may include, but is not limited to, the organization's name, physical locations, services provided and/or goods sold, and the like. Accordingly, base information of the or Additionally or alternatively, S230 may include collecting targeting data at any time. This base information may be used as a starting point to identify targeting data.

S240 includes generating control and configuration campaign parameters. S240 functions to generate control parameters used to define the phishing campaign; e.g., phishing targets, phishing vectors, phishing campaign duration, and phishing campaign timing. S240 also functions to generate configuration parameters used to define one or more characteristic and operational components of the phishing campaign; e.g., website template configuration, number website templates, routing of phished targets, and the like.

S240 preferably includes generating campaign parameters based on targeting data collected by S230, but S240 may additionally or alternatively include generating campaign parameters based on any suitable information (e.g., parameters supplied by a phishing campaign administrator). For example, S240 may include identifying persons with high levels of network access by analyzing LinkedIn data, and then targeting those persons with a phishing campaign.

The targeting data collected at S230 may indicate times at which network traffic is high and email counts to one or more targeted user email accounts are high and thus, S240 may generate a control parameter related to the timing of the phishing campaign in order to align the phishing campaign with the timing of high traffic and high email counts of the one or more targeted users. Accordingly, when network traffic is high and a targeted users email count is high, there is a higher possibility of tricking the user with the contents of the phishing campaign.

Additionally, the targeting data collected at S230 may indicate one or more frequently visited web pages of the targeted organization. Based on this data, S240 generates website template parameters for emulating the most popular or one of the most popular web pages associated with the organization.

S240 preferably includes identifying phishing targets. S240 may include identifying targets specifically (e.g., from social network data, from the organization's website, from internal company lists) and/or broadly (e.g., whoever uses a particular website or service). S240 may additionally or alternatively include classifying and/or grouping phishing targets. For example, S240 may include classifying targets into high-access and low-access targets. Alternatively, S240 may include classifying targets by predicted technical sophistication. In some embodiments, the sophistication of the phishing campaign may be directly linked or tied to the grouping type identified for the targeted users. For instance, when the targeted entity or users are grouped as high-access, the corresponding phishing campaign may be more sophisticated and difficult phishing campaign due to the implied or predicted sophistication of high-access users. In such instance, the converse would apply where a relatively low-sophistication phishing campaign parameters are used based on low-access targets. It should be noted, however, that while phishing campaigns may be generated based on the high or low-access dichotomy, the level of sophistication does not have correspondingly follow a low or high classification. Any level of phishing campaign sophistication may be implemented.

S240 preferably also includes configuring phishing vectors. Phishing vectors may include email, instant messaging, social networks, phone calls, text messages, or any other communication platform (e.g., Yammer, HipChat, Slack). Configuring phishing vectors may include configuring vectors to operate individually (e.g., a text message and/or an email both link to a phishing site) or may include configuring vectors to work in concert (e.g., a text message directs a user to read an email, which contains a link to a phishing site).

Configuring phishing vectors preferably includes configuring vector sources. For example, S240 may include receiving access to an employee communications platform in order to configure phishing messages to be sent on that employee communications platform.

S240 may include configuring phishing vectors on a per-individual basis, on a per-campaign basis, on a per-organization basis, or on any suitable basis. If S240 includes configuring phishing vectors on a per-individual basis, S240 may include automatically identifying optimal vectors for a particular individual; e.g., by vector usage. For example, an employee that uses Slack frequently may be targeted on Slack, while an employee that uses Slack infrequently may be targeted via some other vector, such as email.

S240 preferably includes setting phishing campaign timing. Here timing may refer to how often phishing attacks are attempted, when phishing attacks are attempted, how many phishing attacks are attempted, and overall time limits on the campaign (if present). Campaign timing is preferably set according to a drip schedule; that is, selected individuals are tested at different times during a campaign (as opposed to a one-shot schedule, wherein the entire targeted audience receives phishing messages at the same time). Alternatively, campaign timing may be set according to a one-shot schedule. Setting the campaign timing may be based on a number of different factors, such as the number of employees within an organization, number of targeted users, location and/or decentralization of the organization, and the like. For instance, in a decentralized organization where many of the targeted users work from home or work in offices with relatively a small number of employees, it may be optimal to use a one-shot campaign schedule since the targeted users may be less likely to notice or discuss a potential phishing correspondence with another targeted user. Oppositely, in an organization that is mainly centralized, in which a large number of employees are located in only a few offices or the like, a drip schedule for a phishing campaign may raise the least amount of suspicion among the targeted users since only a limited number of users would be exposed to the phishing campaign.

Campaign timing is preferably conditional (i.e., the length of the campaign is based on response to the campaign) but may alternatively be unconditional. For example, in an unconditional campaign, S240 could include generating campaign parameters that dictate a phishing campaign test an entire population of 500 users every six months by randomly selecting 20 or 21 employees a week to receive a phishing attack. As another example, in a conditional campaign, a campaign may run for particular users until those users successfully avoid succumbing to three phishing attacks in a row. It shall be understood that the conditions applied in a campaign or otherwise used for determining the duration of a campaign may be any condition set by the administrator and/or automatically by a computing system implementing the phishing campaign.

S240 may include adjusting phishing campaign parameters based on response to phishing attacks; for example, S240 may include providing more obvious phishing campaigns to persons who repeatedly fail phishing attack tests (allowing them to train on easier material until they are more sophisticated, for instance). In one implementation, S240 may include generating phishing campaign parameters according to a spaced repetition technique, wherein the length of time between phishing attacks and/or the sophistication level of phishing attacks is increased based on successful user identification of phishing attacks (which may be judged by non-response to phishing attacks).

S250 includes generating campaign templates. S250 functions to generate phishing campaign material (e.g., websites, emails, instant messages, text messages, images, etc.) to be used in phishing attacks according to one or more configuration parameters identified at S240 and otherwise, programmed into the method or provided by the administrator or the like. S250 preferably includes generating campaign templates based on targeting data collected by S230 and phishing campaign parameters generated in S240 (e.g., which vectors are to be used), but may additionally or alternatively include generating campaign templates based on any suitable data.

S250 preferably includes generating phishing websites by mirroring websites already in use by an organization and modifying them to prepare for the phishing attack (e.g., by removing the ability to actually submit sensitive data, by inserting JavaScript that records targeted user activities and/or behavior on the phishing websites, etc.). Specifically, S250 preferably is able to automatically identify services associated with a targeted organization and automatically construct a phishing website by using technique that involves crawling the one or more websites or web content associated with the targeted organization. As described herein, by crawling the one or more websites associated with the targeted organization, S250 is able to identify services and capture the content existing on the one or more websites. The captured data is then used at S250 to replicate fictitious websites together with copied services for implementing a phishing campaign with an attack domain name.

Additionally, or alternatively, S250 may incorporate generating phishing websites in any manner. These websites are preferably identified automatically in S230 and/or S240, but may additionally or alternatively be specified by campaign administrators.

Templates generated by S250 may be generic or personalized; for example, a phishing email may include a field that automatically incorporates the email address owner's name.

S250 may include generating phishing templates according to a set sophistication criterion; for example, a phishing template generated with a low sophistication criterion might appear obviously suspicious to most users, while a phishing template generated with a high sophistication criterion may not appear suspicious to many users. The sophistication criterion may be determined in some embodiments based on a predetermined sophistication threshold; where, in one example, if the quality of the content, images, and other information used in a phishing template is below the predetermined sophistication threshold, then the sophistication criterion is determined to be low, but if the characteristics and quality of the phishing template is equal to or exceeds the predetermined sophistication threshold, then the sophistication criterion is determined to be high.

S250 preferably enables campaign template generation with low campaign administrator involvement, but may additionally or alternatively allow campaign administrators to produce and/or edit campaign templates manually. In some embodiments, S250 enables campaign template generation without any human intervention, including intervention by the administrator, once a phishing campaign is initialized (e.g., by selecting a start button or simply running the program).

S250 may include generating campaign templates based on past or previous campaign data; for example, if a particular style of campaign template is identified as successful, S250 may include increasing the likelihood that that style of campaign template is used or components thereof are considered in campaign template generation.

In a variation of a preferred embodiment, S250 may include inserting a phishing service signature into a phishing email, phishing site, and/or any other phishing template. Such a phishing service signature could be verified by an external provider or vendor possessing a corresponding public key (e.g., an asymmetric public key) in order to distinguish real phishing attacks from the phishing campaign and prevent phishing service servers from being automatically blacklisted (e.g., by Google Apps Mail used in an organization). The signature preferably includes a phishing service identity, but may additionally or alternatively include an identifier that uniquely identifies a piece of content generated in S250 (e.g., the URL of a phishing website, the hash of a phishing email body). The signature may be embedded in any suitable manner, including embedding in a DNS record, in an HTTP header, and in HTML of the phishing website itself. Alternatively, the signature may be hosted at a special designated URL.

S260 includes performing a campaign. S260 functions to run a phishing campaign using the phishing campaign templates generated in S250, according to the phishing campaign parameters generated in S240. For example, S260 may include sending out phishing text messages and emails that direct users to a phishing website (all generated by S250) according to a user list and timing schedule set by S240.

In addition to producing a phishing attack as specified by S240/S250, S260 preferably includes collecting response data (e.g., did a user enter text into a password box on a phishing page, did a user click on a phishing website). S260 preferably includes collecting response data at a finely-grained level in order to provide detailed data for campaign analysis produced by S270.

S260 may additionally include collecting endpoint health data (e.g., how vulnerable a user system is to attack as measured by OS version, browser version, configuration etc.) as described in U.S. Provisional Application No. 62/169,254, the entirety of which is incorporated by this reference.

S270 includes producing campaign analysis. S270 functions to enable campaign administrators to understand the results of a phishing campaign and to take action in response to those results. Specifically, based on one or more of the response data, user activity and behavior data, and the like, S270 is able to generate comprehensive information and illustrations (e.g., graphs, charts, and the like) about the results of the phishing campaign for consideration and possibly, further exploration by an administrator. The comprehensive information and illustrations may include selectable elements which may be selected by the administrator to expand information therein and/or to perform further analysis on the information and/or illustration. Therefore, an administrator is able to analyze the results at a fine-grained level using one or more tools provided with the phishing campaign results.

Figures 4A, 4B:
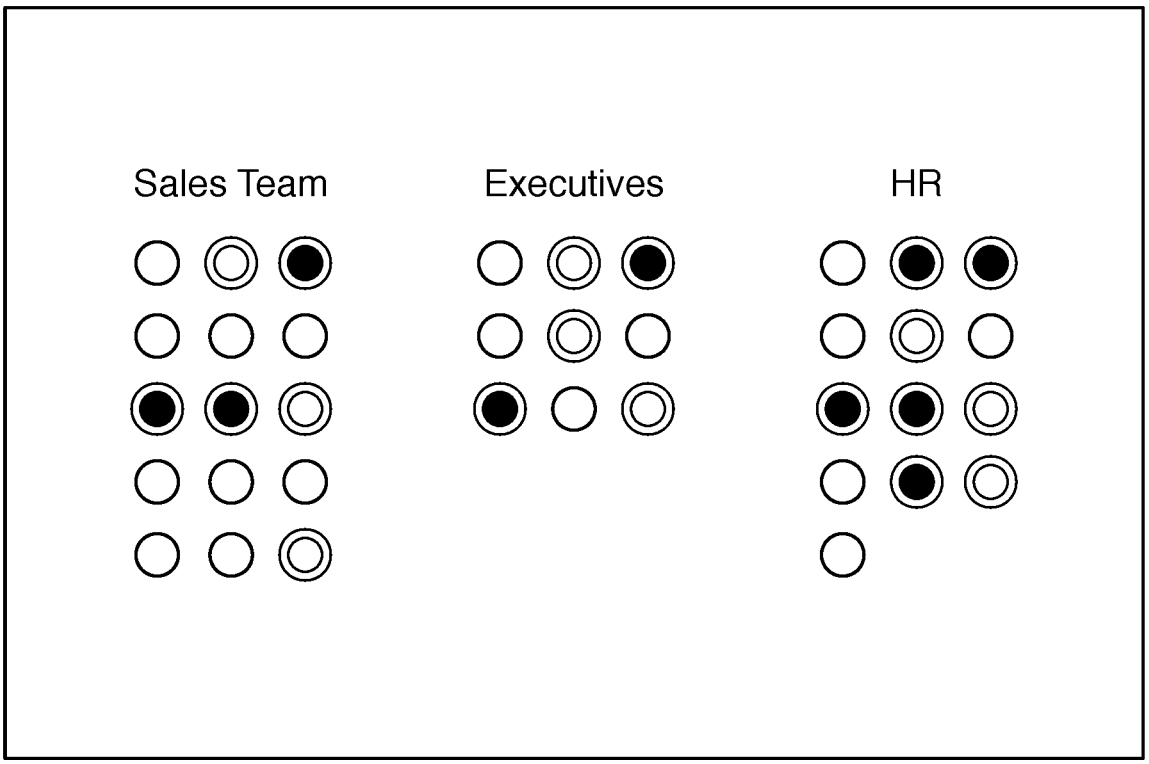
FIG. 4A is an example interface of an analysis page.
FIG. 4B is an example interface of an analysis page.

S270 preferably includes providing a real-time campaign analysis interface (e.g., phishing assessment interface) that tracks activities of users being assessed and how users respond to a phishing campaign. This interface could take the appearance of an interface that shows all users currently interacting with the phishing campaign with some indication of their status (e.g., "seen campaign", "clicked on phishing link", "entered credentials into link", and the like), as shown in FIG. 4A, or it could take any other appearance. Such an interface could then allow individual users to be selected, prompting a user-detail page to be displayed as shown in FIG. 4B. Event tracking may be performed by S270 according to any level of detail; for example, S270 may track user cursor location every 100 ms to determine how the user interacts with phishing campaign material.

S270 preferably additionally includes providing post-campaign (or during-campaign) analysis on the progress of the campaign over time. For example, S270 may generate analysis on which users are most at risk for phishing attacks, so those users may be given special training. As another example, S270 may track phishing response rate over time to determine if the employee base of an organization is improving at detecting phishing attacks.

In addition to producing campaign analysis, S270 may additionally or alternatively include providing suggestions to campaign administrators on how to improve security. For example, S270 may include suggesting that a department be subject to a higher frequency of phishing campaigns in response to repeated failures by members of that department.

Any of real-time campaign analysis, post-campaign analysis, and security suggestions may be augmented or aided by endpoint health data collected in S260 (or in any other manner).

S270 may also include exporting campaign analysis; for example, a campaign administrator may send campaign analysis produced in S270 to a computer security company to receive suggestions on how to improve education and/or policy within the organization.

The method of the preferred embodiment and variations thereof can be embodied and/or implemented at least in part as a machine configured to receive a computer-readable medium storing computer-readable instructions. The instructions are preferably executed by computer-executable components preferably integrated with a phishing campaign service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system that tests for vulnerabilities in a computer network, the system comprising:
   a phishing assessment computing server comprising one or more computer processors configured to test the computer network by:
      initializing the phishing assessment, wherein the initializing includes:
         collecting target entity data based on receiving an input of a target entity associated with the computer network; and
         dynamically generating phishing attack constructs based on an input of the target entity data, wherein the phishing attack constructs comprise one or more fictitious attack domain names and one or more fictitious attack web pages, and wherein the one or more fictitious attack domain names are dynamically generated by modifying a target domain name;
      configuring the phishing assessment, wherein the configuring includes:
         setting an attack schedule for deploying one or more phishing attacks of the phishing assessment;
         setting a testing duration of the phishing assessment;
         determining a rating for each of the one or more fictitious attack domain names according to probable phishing attack effectiveness; and
         setting a level of testing difficulty from a plurality of conditional levels of difficulty for the phishing assessment, wherein the level of testing difficulty is based on at least the ratings of fictitious attack domain names; and
      testing for vulnerabilities in the computer network by deploying the configured phishing assessment using the dynamically generated phishing attack constructs according to [i] the attack schedule, [ii] the testing duration, and [iii] the level of difficulty.

2. The system of claim 1, wherein
   initializing the phishing assessment further includes:
      identifying one or more target users of the computer network based on the input of the target entity data; and
      identifying one or more communication vectors associated with the one or more target users of the computer network.

3. The system of claim 1, wherein the initializing further includes:
   using the collected target entity data to identify most frequently visited websites by the one or more target users of the computer network,
   wherein generating the phishing attack constructs includes constructing a phishing attack website that mirrors a most frequently visited website of the identified most frequently visited websites.

4. The system of claim 3, wherein
   generating the phishing attack constructs includes removing or disabling an ability of the phishing attack website to collect user credentials or passwords.

5. A method that tests for vulnerabilities in a computer network, the method comprising:
   at a phishing assessment computing server comprising one or more computer processors configured to test the computer network:
      initializing the phishing assessment, wherein the initializing includes:
         collecting target entity data based on receiving an input of a target entity associated with the computer network; and
         dynamically generating phishing attack constructs based on an input of the target entity data, wherein the phishing attack constructs comprise one or more fictitious attack domain names and one or more fictitious attack web pages, and wherein the one or more fictitious attack domain names are dynamically generated by modifying a target domain name;
      configuring the phishing assessment, wherein the configuring includes:
         setting an attack schedule for deploying one or more phishing attacks of the phishing assessment;
         setting a testing duration of the phishing assessment;
         determining a rating for each of the one or more fictitious attack domain names according to probable phishing attack effectiveness; and
         setting a level of testing difficulty from a plurality of conditional levels of difficulty for the phishing assessment, wherein the level of testing difficulty is based on at least the ratings of fictitious attack domain names; and
      testing for vulnerabilities in the computer network by deploying the configured phishing assessment using the dynamically generated phishing attack constructs according to [i] the attack schedule, [ii] the testing duration, and [iii] the level of difficulty.

6. The method of claim 5, wherein
   testing for vulnerabilities in the computer network by deploying the configured phishing assessment is performed automatically and autonomously by the phishing assessment computer server without human intervention, and wherein
   initializing the phishing assessment further includes determining whether an entity server associated with the target entity possesses one or more permissions for implementing the phishing campaign.

7. The method of claim 6, further comprising:
   authorizing an administrator for administering the phishing campaign, wherein authorizing the administrator includes:
      collecting administrator data from one or more internal source of the target entity and/or from one or more web sources external to the target entity;
      generating an authorization score for the administrator based on the collected administrator data, wherein the authorization score indicates an authorization level of a potential administrator of the phishing assessment, wherein the administrator comprises one of a network administrator or an administrative computer of the target entity.

8. The method of claim 7, further comprising:
in response to generating the authorization score, setting the authorization level of the administrator, wherein setting the authorization level includes:
setting a first authorization level for the administrator if the authorization score satisfies an authorization threshold, and
setting a second authorization level for the administrator if the authorization score does not satisfy the authorization threshold but is above a minimum threshold.

9. The method of claim 5, wherein
the testing duration of the phishing assessment is conditional;
setting the testing duration of the phishing assessment is based on a condition that the one or more target users successfully not succumbing to one or more phishing attacks implemented via the phishing campaign for a predetermined number of times.

10. The method of claim 5, wherein
the testing duration of the phishing assessment is unconditional and predetermined;
setting the testing duration of the phishing assessment is based on testing a predetermined population over a predetermined period.

11. The method of claim 10, wherein
setting the testing duration of an unconditional phishing assessment includes randomly selecting a subset of target users to test via the phishing assessment over predetermined sub-periods of the predetermined period until all target users of the target entity have been tested.

12. The method of claim 5, further comprising:
identifying a plurality of communication vectors associated with the one or more target users of the computer network based on the target entity data; and
setting a phishing attack communication vector by selecting a communication vector from the plurality of communication vectors having a highest communication traffic.

13. The method of claim 5, further comprising:
setting timings of one or more phishing attacks deployed against the computer network based on the collected target entity data,
wherein setting the timings includes:
identifying one or more network communication traffic times over the network;
selecting a deployment time for the one or more phishing attacks that is aligned with a highest network communication traffic time of the one or more network communication traffic times.

14. The method of claim 5, wherein
the one or more target users comprise a plurality of target users of the computer network;
the method further comprises:
classifying the plurality of target users into high-access targets and low-access targets based on the collected target entity data.

15. The method of claim 6, wherein
setting the level of difficulty of the phishing assessment is further based on the classification of the one or more target users, and wherein the level of difficulty of the phishing assessment is set to a sophistication level above a sophistication threshold based on a high-access classification of the one or more target users.

16. The method of claim 6, wherein
setting the level of difficulty of the phishing assessment is further based on the classification of the one or more target users, and wherein
the level of difficulty of the phishing assessment is set to a sophistication level below a sophistication threshold based on a high-access classification of the one or more target users.

17. The method of claim 5 further comprising:
identifying one or more communication vectors associated with the one or more target users of the computer network based on the collected target entity data; and
configuring the one or more communication vectors on a per-target user basis based on usage of the one or more communication vectors by each of the one or more target users.

18. The method of claim 5, further comprising:
adjusting the level of testing difficulty of the phishing assessment based on responses to one or more phishing attacks of the phishing assessment collected from the one or more target users,
wherein the level of testing difficulty of the phishing assessment is increased if the one or more target users do not succumb to the one or more phishing attacks.

19. The method of claim 5, further comprising:
adjusting the level of testing difficulty of the phishing assessment based on responses to one or more phishing attacks of the phishing assessment collected from the one or more target users,
wherein the level of testing difficulty of the phishing assessment is decreased if the one or more target users succumb to the one or more phishing attacks.

20. A method for testing a susceptibility of a computer network to phishing attacks, the method comprising:
at a web-based software platform implementing by one or more web computing servers:
initializing the phishing assessment, wherein the initializing includes:
collecting target entity data based on receiving an input of a target entity associated with the computer network; and
dynamically generating phishing attack constructs based on an input of the target entity data, wherein the phishing attack constructs comprise one or more fictitious attack domain names and one or more fictitious attack web pages, and wherein the one or more fictitious attack domain names are dynamically generated by modifying a target domain name;
configuring the phishing assessment, wherein the configuring includes:
setting an attack schedule for deploying one or more phishing attacks of the phishing assessment;
setting a testing duration of the phishing assessment;
determining a rating for each of the one or more fictitious attack domain names according to probable phishing attack effectiveness; and
setting a level of testing difficulty from a plurality of conditional levels of difficulty for the phishing assessment, wherein the level of testing difficulty is based on at least the ratings of fictitious attack domain names; and testing for vulnerabilities in the computer network by deploying the configured phishing assessment using the dynamically generated phishing attack constructs according to [i] the attack schedule, [ii] the testing duration, and [iii] the level of difficulty.

* * * * *

UNITED STATES PATENT AND TRADEMARK OFFICE
CERTIFICATE OF CORRECTION

PATENT NO. : 10,505,968 B2  
APPLICATION NO. : 15/936609  
DATED : December 10, 2019  
INVENTOR(S) : Jon Oberheide Page 1 of 1

It is certified that error appears in the above-identified patent and that said Letters Patent is hereby corrected as shown below:

On the Title Page

Column 1, (72) Inventor, Line 1:
Delete "CA" and insert --MI-- therefor

Signed and Sealed this
Third Day of March, 2020

Andrei Iancu
*Director of the United States Patent and Trademark Office*